US011719510B2

(12) United States Patent
Gröner et al.

(10) Patent No.: US 11,719,510 B2
(45) Date of Patent: Aug. 8, 2023

(54) LIGHT DOT SIGHT

(71) Applicant: Carl Walther GmbH, Ulm (DE)

(72) Inventors: Christoph Gröner, Hetschwang (DE); Eyck Pflaumer, Arnsberg (DE); Martin Wonisch, Arnsberg (DE)

(73) Assignee: Carl Walther GmbH, Ulm (DE)

( * ) Notice: Subject to any disclaimer, the term of this patent is extended or adjusted under 35 U.S.C. 154(b) by 133 days.

(21) Appl. No.: 17/159,420

(22) Filed: Jan. 27, 2021

(65) Prior Publication Data

US 2021/0364251 A1 Nov. 25, 2021

(30) Foreign Application Priority Data

May 19, 2020 (DE) ..................... 10 2020 113 533.5

(51) Int. Cl.
*F41G 1/30* (2006.01)
*G02B 23/10* (2006.01)
*G02B 23/04* (2006.01)

(52) U.S. Cl.
CPC ............... *F41G 1/30* (2013.01); *G02B 23/04* (2013.01); *G02B 23/105* (2013.01)

(58) Field of Classification Search
CPC .......... F41G 1/30; G02B 23/04; G02B 23/105
USPC .......................................................... 42/118
See application file for complete search history.

(56) References Cited

U.S. PATENT DOCUMENTS 3,963,356 A * 6/1976 Wiklund ................ G02B 27/34 359/629
5,440,387 A * 8/1995 Montelin ............ G02B 23/105 42/113
5,594,584 A * 1/1997 Kay ........................ F41G 1/345 359/429
7,916,290 B2 * 3/2011 Koehler ............ G02B 27/0025 356/252
2009/0265974 A1 * 10/2009 Joannes .................... F41G 1/48 235/404
2018/0156573 A1 * 6/2018 Capson ..................... F41G 1/30
2021/0055536 A1 * 2/2021 DeAngelis ................ F41G 1/30
2021/0333067 A1 * 10/2021 Kennedy ................ G02B 5/286
2022/0034629 A1 * 2/2022 Hamilton ............... G02B 23/10
2022/0196366 A1 * 6/2022 Beckman .................. F41G 3/12

FOREIGN PATENT DOCUMENTS

WO 91/19158 A1 12/1991

* cited by examiner

*Primary Examiner* — Samir Abdosh
(74) *Attorney, Agent, or Firm* — Bachman & LaPointe, P.C.

(57) ABSTRACT

With a light dot sight (100) that can be affixed in the region of the surface of a breech of a firearm. The sight has a partially transparent reflector element (110) which reflects the parallel light of a light source (120) mounted on the firearm, into the eye of the shooter to focus to a point on the retina of the shooter. Obstruction of a field of view of the shooter directed to a special event is avoided in that the undersurface (111) of the partially transparent reflector element (110) has a width which has dimensions for directly and robustly anchoring the reflector element (110) in the region of the surface of the breech by means of a fastener.

3 Claims, 2 Drawing Sheets

130
120
150
200
110
100
110
140
111

LIGHT DOT SIGHT

CROSS-REFERENCE TO RELATED APPLICATION

Priority is claimed of German Patent Application No. DE102020113533.5, filed May 19, 2020, and entitled "Light Dot Sight", the disclosure of which is incorporated by reference herein in its entirety as if set forth at length.

BACKGROUND

The invention relates to a light dot sight which can be affixed to the surface of a breech of a firearm with a partially transparent reflector element that reflects the parallel light of a light source attached to the firearm and focused on the retina of a shooter into the eye of the shooter.

Light dot sights of the type mentioned above are used in the prior art as target devices, in particular for handguns. The known light dot sights, however, have the disadvantage that the reflector element is inserted into a usually metallic socket (shroud), by means of which the reflector element is anchored at least indirectly in the surface of the breech.

The metallic socket has the disadvantage that important areas in the field of view of a shooter are obscured by the socket in such a mounting, so that the shooter cannot fully perceive an event taking place around him.

SUMMARY

The object of the invention is therefore to create a light dot sight which never restricts the field of view of a shooter directed to a particular event.

For a light dot sight of the above mentioned type, this object is achieved according to the invention in that the undersurface of the partially transparent reflector element has a width which is dimensioned for anchoring the reflector element directly and robustly in the region of the surface of the breech by means of a fastener.

Preferred embodiments of the invention are the subject matter of the subordinate claims, the elements of which act in the sense of a further improvement of the approach to achieving the object underlying the invention.

With the light dot sight according to the invention, by means of the combination of features that the undersurface of the partially transparent reflector element has a width which is dimensioned for anchoring the reflector element robustly in the region of the surface of the breech by means of a fastener, a device is created by means of which a completely unobstructed view of an observed event is enabled for a shooter with his weapon aimed.

According to a first preferred embodiment of the light dot sight according to the invention, it is provided that the width of the partially transparent reflector element in the region of the undersurface close to the breech is larger than the width of the optically effective area of the partially transparent reflector element remote from the breech.

As an alternative to the above embodiment, the width of the partially transparent reflector element in the region of the undersurface close to the breech may have the same dimensions as the optically effective area of the partially transparent reflector element remote from the breech, wherein due to the total thickness of the reflector element the undersurface of the partially transparent reflector element then has a width which is sufficiently dimensioned for anchoring the reflector element robustly by means of a fastener.

The reflector element is traditionally formed by a plane parallel plate provided with a partially reflective surface or by a concave/convex lens provided with a partially reflective rear surface. In the latter case, the concave rear surface of the concave/convex lens acts like a hollow mirror as a collimator for the divergent light of the light source.

Preferably, an adhesive is provided as a fastener. Alternatively, the fastener may be formed by one or more screws that are guided at a predetermined angle through the reflector element and anchored in the region of the surface of the breech.

Between the light source and the reflector element, a collimator in the form of a collection lens, which transfers the light of the light source usually formed by an LED into a parallel beam of light, may preferably be arranged in the immediate vicinity of the light source, wherein the light source and the collimator are combined into a robust unit, which is anchored in the surface of the breech in front of the reflector element by means of one or more screws as anchoring elements or by means of an adhesive.

According to an important preferred embodiment of the light dot sight according to the invention, the light source, the collimator in the form of a lens and the reflector element are combined into a robust unit, which is anchored by means of one or more anchoring elements such as screws or adhesive in the region of the surface of the breech.

BRIEF DESCRIPTION OF THE DRAWINGS

The light dot sight according to the invention is explained below on the basis of a preferred embodiment, which is shown in the figures of the drawing. In the figures.

DETAILED DESCRIPTION

Figure 1:
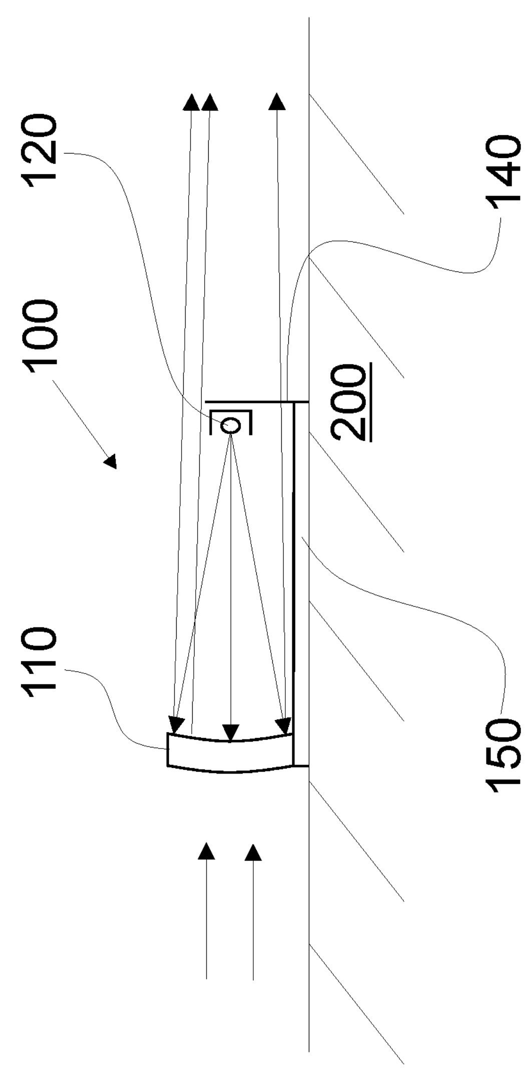
FIG. 1 shows a first preferred embodiment of the light dot sight according to the invention in a side view.
Figure 2:
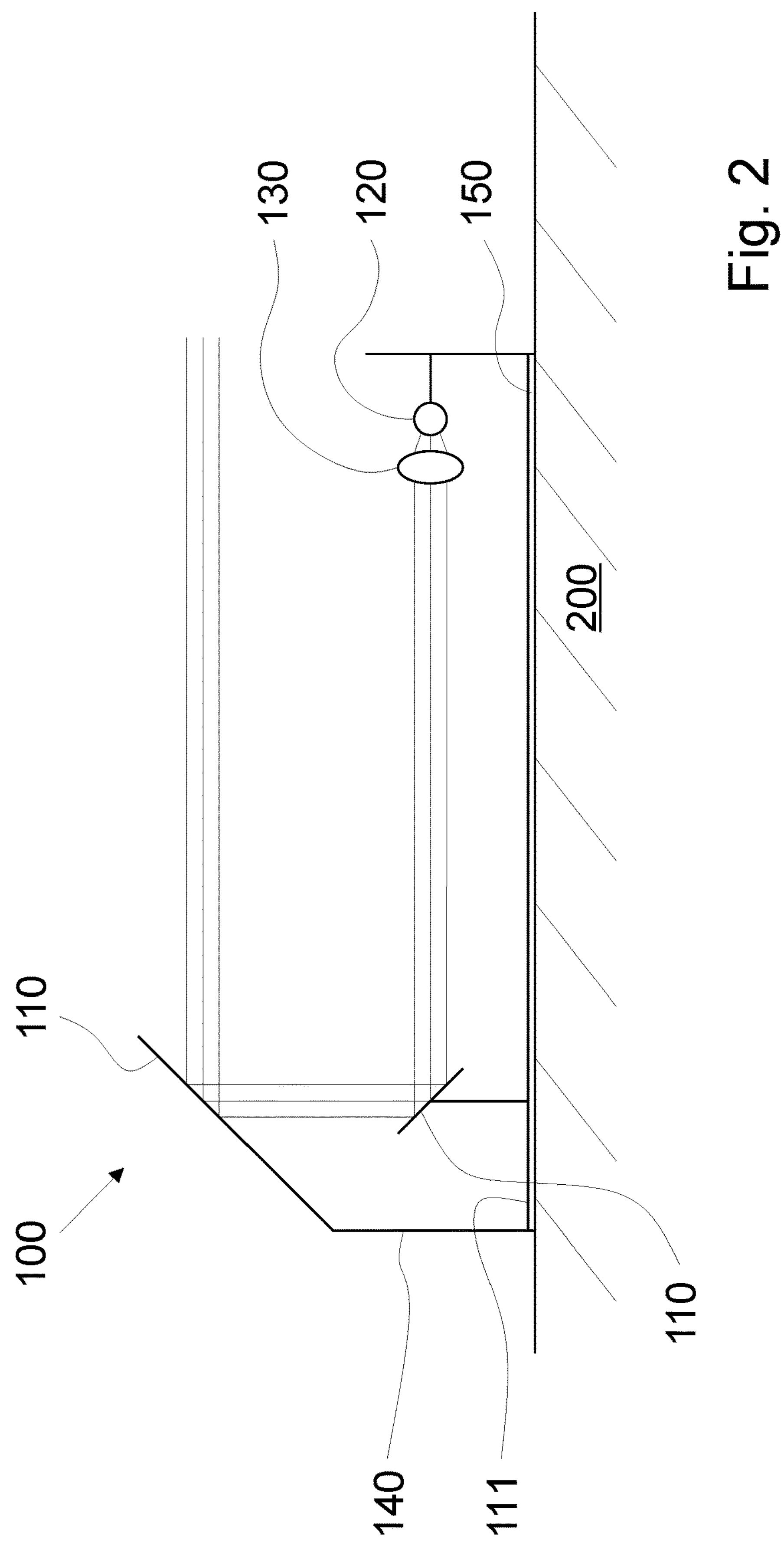
FIG. 2 shows a second preferred embodiment of the light dot sight according to the invention in a side view.

The light dot sights 100 according to the invention shown in FIGS. 1 and 2 can be attached in the region of the surface of a breech 200 of a firearm and each contains a partially transparent reflector element 110, which reflects the parallel light of a light source 120 attached to the firearm and focused to a point on the retina of the shooter's eye into the eye of the shooter.

The undersurface 111 of the partially transparent reflector element 110 has a width which is dimensioned for anchoring the reflector element 110 robustly in the region of the surface of the breech 200 by means of a fastener.

The width of the undersurface 111 of the partially transparent reflector element 110 is dimensioned for anchoring the socketless (shroudless) reflector element 110 robustly in the region of the surface of the breech 200 by means of a fastener acting directly on the reflector element 110.

According to the embodiment of the present invention shown in FIG. 1, the width of the partially transparent reflector element 110 in the region of the undersurface 111 close to the breech has the same dimensions as the optically effective regions of the partially transparent reflector element 110 remote from the breech, wherein due to the total thickness of the reflector element 110, the undersurface 111 of the partially transparent reflector element 110 has sufficient width for anchoring the reflector element 110 robustly in the region of the surface of the breech 200 by means of an adhesive.

The reflector element 110 is formed by a concave/convex lens provided with a partially reflective rear surface, wherein the concave rear surface of the concave/convex lens acts similarly to a collecting lens as a collimator 130 for the divergent light of the light source 120.

According to the embodiment of the present invention shown in FIG. 2, a collimator 130 is arranged between the light source 120 and the reflector element 110 designed as a plan-parallel plate, which transfers the light of the light source 120 into a parallel light beam, wherein the light source 120, the collimator 130 and the reflector element 110 are combined into a robust unit 140, which is anchored in the surface of the breech 200 in front of the reflector element 110 by means of an adhesive as anchoring elements.

The embodiment of the invention explained above is used only for the purpose of a better understanding of the teaching according to the invention specified by the claims, which as such is not restricted by the exemplary embodiment.

LIST OF REFERENCE SIGNS

Below is a list of reference signs used in the drawing:

100 light dot sight
110 reflector element
111 undersurface of the reflector element
120 light source
130 collimator
140 robust unit
150 layer of adhesive
200 breech

What is claimed is:

1. A light dot sight (100), attached to a surface of a breech (200) of a firearm, and comprising:
- a light source (120) emitting divergent light;
- a partially transparent reflector element (110), which reflects the light of the light source wherein reflected light is focused to a point on a retina of an eye of a shooter, wherein:
- the reflector element (110) is formed by a lens having:
  - a convex front surface; and
  - a partially reflective concave rear surface;
- the concave rear surface of the lens acts as a collimator for the divergent light of the light source (120); and
- an undersurface (111) of the partially transparent reflector element (110) is anchored to the surface of the breech (200) by means of a fastener formed by an adhesive (150).

2. The light dot sight (100) according to claim 1, characterized in that the partially transparent reflector element is shroudless.

3. A method for using the light dot sight (100) of claim 1, the method comprising:
- the partially transparent reflector element (110) collimating the divergent light emitted by the light source (120);
- the partially transparent reflector element (110) reflecting the collimated light; and
- the partially reflector element (110) focusing the reflected light to the point on the retina of the shooter.

* * * * *